(12) United States Patent
Görlich et al.

(10) Patent No.: US 10,782,874 B2
(45) Date of Patent: Sep. 22, 2020

(54) USER INTERFACE AND METHOD FOR OPERATING A SYSTEM

(71) Applicants: Siemens Aktiengesellschaft, Munich (DE); Wincor Nixdorf International GmbH, Paderborn (DE)

(72) Inventors: Jürgen Görlich, Marienfeld (DE); Matthias Lindemann, Paderborn (DE); Michael Nolte, Brakel (DE); Klaus-Peter Wegge, Paderborn (DE)

(73) Assignee: AEVI INTERNATIONAL GMBH, Paderborn (DE)

( * ) Notice: Subject to any disclaimer, the term of this patent is extended or adjusted under 35 U.S.C. 154(b) by 0 days.

(21) Appl. No.: 15/532,369

(22) PCT Filed: Nov. 6, 2015

(86) PCT No.: PCT/EP2015/075886
§ 371 (c)(1),
(2) Date: Jun. 1, 2017

(87) PCT Pub. No.: WO2016/087156
PCT Pub. Date: Jun. 9, 2016

(65) Prior Publication Data
US 2017/0329510 A1    Nov. 16, 2017

(30) Foreign Application Priority Data

Dec. 2, 2014    (DE) .................. 10 2014 224 674

(51) Int. Cl.
*G06F 3/0488*    (2013.01)
*G06F 3/01*    (2006.01)
(Continued)

(52) U.S. Cl.
CPC .......... *G06F 3/04883* (2013.01); *G06F 3/016* (2013.01); *G06F 3/0233* (2013.01);
(Continued)

(58) Field of Classification Search
CPC ........ G06F 3/041; G06F 3/016; G06F 3/0233; G06F 3/0481; G06F 3/04847;
(Continued)

(56) References Cited

U.S. PATENT DOCUMENTS

2010/0073329 A1*    3/2010 Raman ................ G06F 3/04883
345/177
2012/0062465 A1*    3/2012 Spetalnick ............ G06F 3/0236
345/168

(Continued)

FOREIGN PATENT DOCUMENTS

EP    2717150 A2    4/2014
WO    WO 0219081 A2    3/2002

OTHER PUBLICATIONS

Guerreiro T. et al.: "From Tapping to Touching: Making Touch Screens Accessible to Blind Users"; IEEE Multimedia, IEEE Service Center, New York, NY, US; Bd. 15, Nr. 4; pp. 48-50; XP011241251; ISSN: 1070-986X, DOI: 10.1109/MMUL.2008.88; 2008.

(Continued)

*Primary Examiner* — Alexander Eisen
*Assistant Examiner* — Cory A Almeida
(74) *Attorney, Agent, or Firm* — Schmeiser, Olsen & Watts, LLP

(57) ABSTRACT

The simple gesture control of the user interface can be used by visually impaired or blind people in order to enter telephone numbers or account numbers for example. The user interface and the method constitute a shift from the current paradigm of guiding a user on touchscreens, which has precisely the advantage of the handeye coordination allowed by the touchscreen, wherein a user touches the exact location on the touchscreen where a corresponding selection surface is visualized. Instead, a swiping gesture is supported which can be carried out in any region on the touch-sensitive surface and shifts the focus from one selection surface or (Continued)

virtual button to the next. The swiping gesture can be carried out not just in the horizontal and vertical direction but also in a diagonal direction. Diagonal swiping gestures allow a particularly quick selection of the corresponding virtual buttons.

20 Claims, 5 Drawing Sheets

(51) Int. Cl.
*G09B 21/00* (2006.01)
*G06F 3/023* (2006.01)
*G06F 3/0481* (2013.01)
*G06F 3/0484* (2013.01)

(52) U.S. Cl.
CPC ........ *G06F 3/0481* (2013.01); *G06F 3/04847* (2013.01); *G09B 21/003* (2013.01); *G09B 21/006* (2013.01); *G09B 21/008* (2013.01)

(58) Field of Classification Search
CPC . G06F 3/04883; G09B 21/003; G09B 21/006; G09B 21/008
See application file for complete search history.

(56) References Cited

U.S. PATENT DOCUMENTS

2013/0185650 A1* 7/2013 Gutowitz ............... G06F 3/017
715/752
2014/0215340 A1* 7/2014 Shetty ................. G06F 3/0488
715/727
2015/0119108 A1* 4/2015 Philbin ............. H04W 52/0254
455/566

OTHER PUBLICATIONS

Apple: "VoiceOver für iOS"; [recherchiert am Aug. 27, 2015]; Nov. 25, 2014; <URL:https://web.archive.org/web/20141125185305/http://www.apple.com/de/accessibility/ios/voiceover/>.

Joao Oliveira et al.: "Blind people and mobile touch-based text-entry: Acknowledging the Need for different flavours"; Computers and Accessibility, ACM, 2 Pennplaza, Suite 701 New York NY 10121-0701; USA; pp. 179-186; XP058005591; DOI: 10.1145/2049536.2049569; ISBN: 978-1-4503-0920-2; 2011.

"Die Gesten zur Erkundung und Steuerung von iPhone und iPad; Tabelle der Gesten und ihre Wirkung" <URL:http://www.apfelschule.ch/index.php/anleitungen-fuer-das-selbstaendig>; [recherchiert an Aug. 27, 2015] zuletzt aktualisiert am Dienstag, 10. Dezember 2013.

PCT International Search Report of International Searching Authority dated Feb. 5, 2016 corresponding to PCT International Application No. PCT/EP2015/075886 filed Nov. 6, 2015.

Office Action of the German Patent and Trademark Office dated Aug. 28, 2015 corresponding to the German Patent Application No. 10 2014 224 674.1.

* cited by examiner

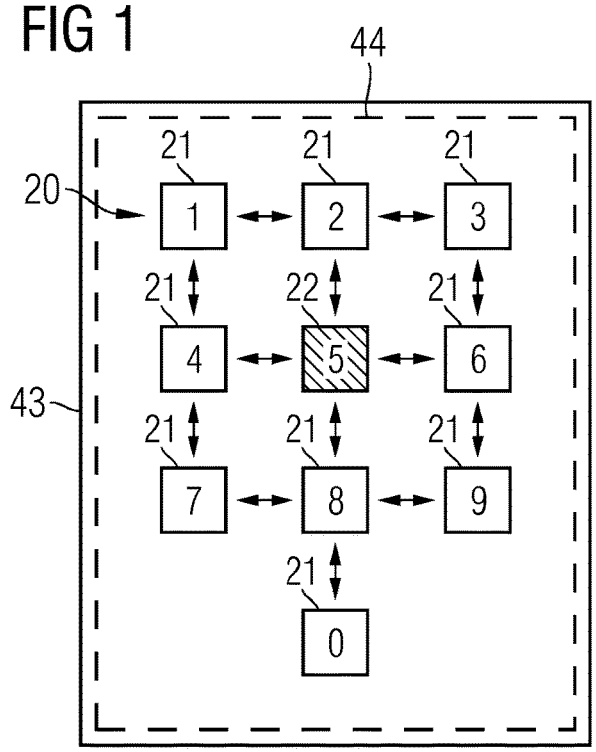
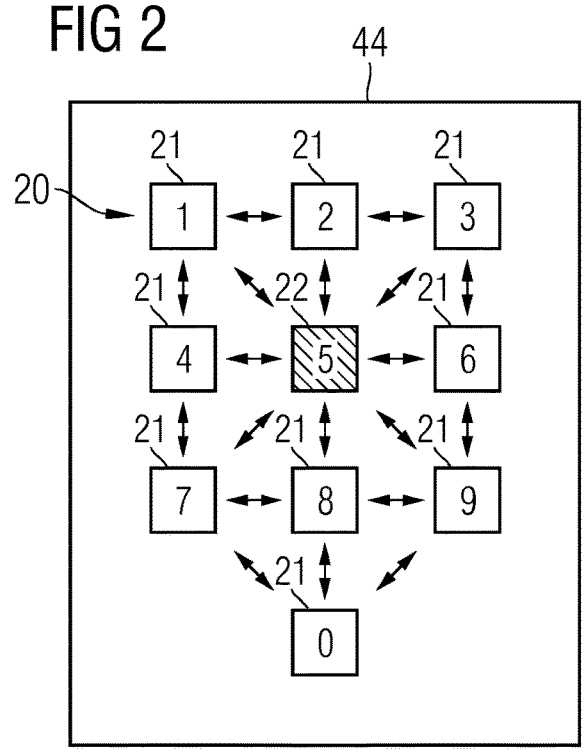
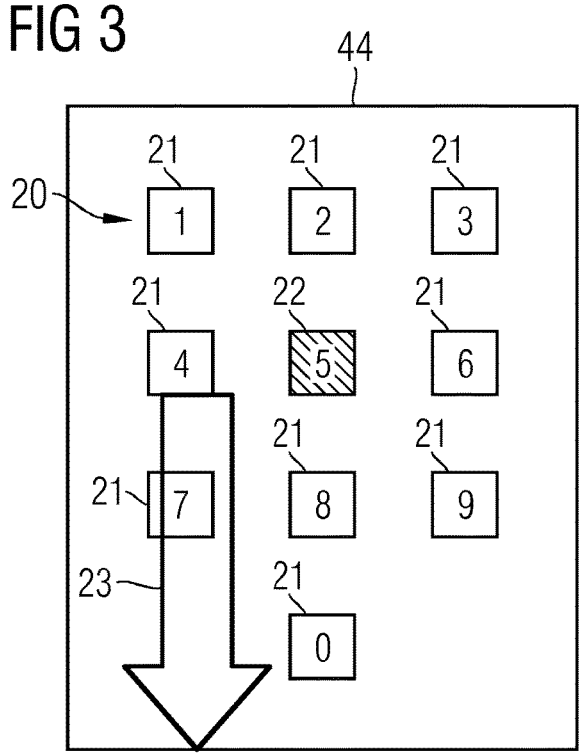
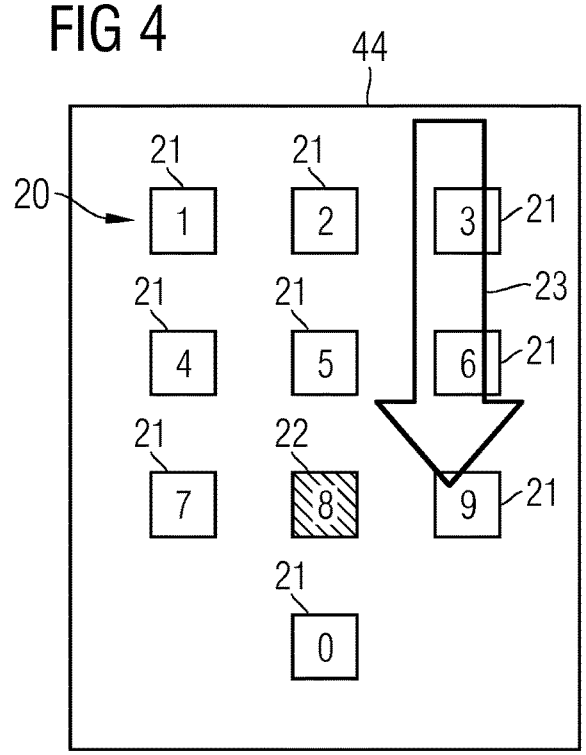

FIG 6
FIG 7
FIG 8
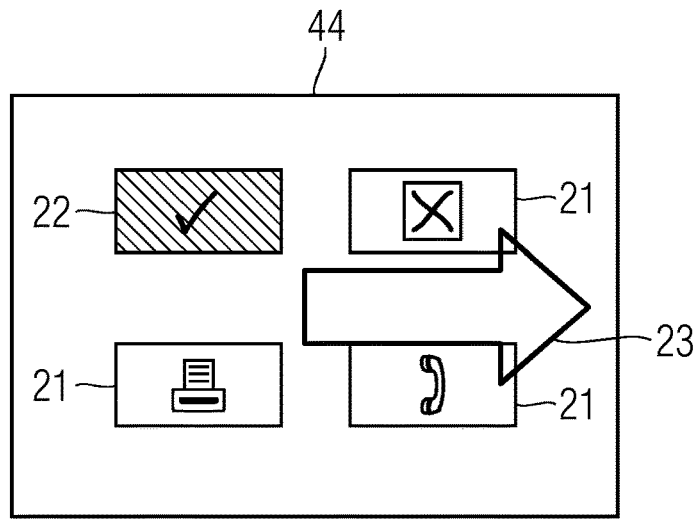
FIG 9
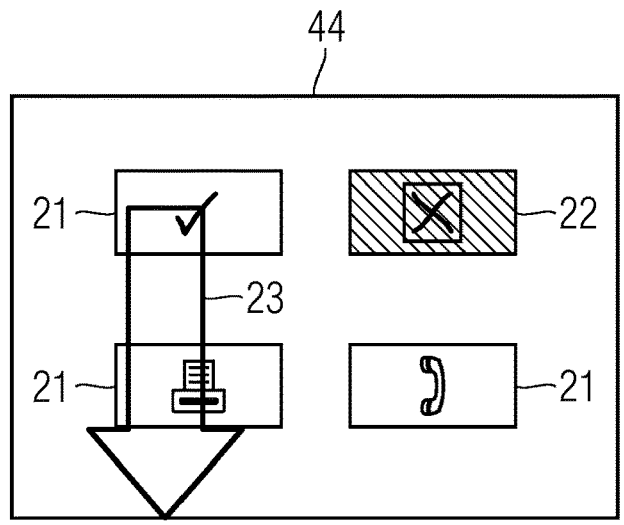
FIG 10

USER INTERFACE AND METHOD FOR OPERATING A SYSTEM

CROSS-REFERENCE TO RELATED APPLICATIONS

This application claims priority to PCT Application No. PCT/EP2015/075886, having a filing date of Nov. 6, 2015, based off of German application No. DE 102014224674.1, having a filing date of Dec. 2, 2014, the entire contents both of which are hereby incorporated by reference.

FIELD OF TECHNOLOGY

The changeover from mechanical keypads to touch-based operation by means of touchpads, touchscreens or multi-touch screens gives rise to the problem that the keypad, its layout and the individual keys and the pressure points thereof are no longer perceptible. This particularly hampers inputs by visually impaired or blind people, since learnable tactile orientation points are no longer present on a flat touchpad or touchscreen.

BACKGROUND

The term touchscreen is subsequently also understood to mean multi-touch screens.

SUMMARY

The following invention is intended to provide a user interface and a method for operating a touchscreen that allow intuitive operation of the touchscreen by visually impaired or blind people too.

An aspect relates to a user interface that contains a touchscreen that is set up for visual output and for capture of touch inputs. The user interface also contains an audio unit and a processor or multiple processors that are programmed to present an arrangement of virtual keys on the touchscreen, precisely one of which is selected at any time, and to actuate the audio unit to audibly output a label or function of each of the virtual keys as soon as said virtual key is selected.

The user interface is characterized in that the processor or the processors are programmed to process a touch input on the touchscreen that can be performed as a swipe gesture in any region on a touch-sensitive surface of the touchscreen, and to select a virtual key that is arranged next to the previously selected virtual key in the direction of the swipe gesture. The swipe gestures in this instance are horizontal and vertical swipe gestures, or horizontal, vertical and diagonal swipe gestures, and the virtual keys are arranged in a rectangular grid, so that horizontal, vertical or diagonal neighbors of the selected virtual key are explicitly determined.

In the method for operating a touchscreen for visually impaired or blind people, a processor or multiple processors present an arrangement of virtual keys, precisely one of which is selected at any time, on a touchscreen and actuate an audio unit to audibly output a label or function of each of the virtual keys as soon as said virtual key is selected.

The method is characterized in that the processor or the processors process a touch input on the touchscreen that is performed as a swipe gesture in any region on a touch-sensitive surface of the touchscreen, and select a virtual key that is arranged next to the previously selected virtual key in the direction of the swipe gesture. The swipe gestures in this instance are horizontal and vertical swipe gestures, or horizontal, vertical and diagonal swipe gestures, and the virtual keys are arranged in a rectangular grid, so that horizontal, vertical or diagonal neighbors of the selected virtual key are explicitly determined.

The computer-readable data storage medium stores a computer program that performs the method when it is executed in a processor or multiple processors.

The computer program is executed in a processor or multiple processors and in so being performs the method.

The access system, the self-service terminal, the checkout system, the payment terminal, the automated teller machine, the credit transfer terminal, the parcel machine, the smartphone, the tablet, the laptop and the personal computer each have the user interface.

The advantages cited below do not necessarily have to be attained via the subjects of the independent patent claims. Rather, they may also be advantages that are attained merely by individual embodiments, variants or developments that are described in the subclaims and exemplary embodiments.

The term character is understood to mean letters, numerals and special characters, for example, as are defined in the ASCII and Unicode character sets, for example. Other character sets that comprise neither the Latin alphabet nor the ten Arabic numerals can also be understood by the term character. In addition, the characters may be not just representable characters but also nonprintable control characters. In addition, the term character can also be understood in the sense of a function of a button, such as "OK" or "abort", for example. In one frequent instance of application, the characters input are digits, such as in telephone numbers and account numbers, for example. Every virtual key has an assigned character that can be input using it. Alternatively, the virtual keys may also have associated functions such as "print".

The functions of the user interface are provided by one or more processors. In one variant, a single processor is programmed to perform all steps of the method. In another variant, a first processor is provided in order to process the touch inputs, while a second processor is programmed to select the virtual keys. A third processor can prompt voice synthesis and voice output for the selected virtual keys. All of the functions described in the exemplary embodiments can therefore be provided by one processor on its own, by multiple processors collectively or by division of work among multiple processors. The processors may be installed as microprocessors in computers, terminals or mobile terminals, for example, but they may also be part of microcontrollers.

The user interface and the method are suitable for all systems that are controlled by means of a touch-sensitive surface. These particularly also include user interfaces having a multi-touch screen. The simple gesture control of the user interface and of the method can be used to input telephone numbers or account numbers, for example. However, it is also suitable for text input by means of a virtual keypad in QWERTY, QWERTZ or DVORAK layout. The method is particularly suitable for visually impaired or blind people.

The user interface and the method are a departure from the established paradigm of user guidance on touchscreens, which considers the advantage of the touchscreen to be precisely that of allowing hand/eye coordination by virtue of a user touching precisely the point on the touchscreen at which an applicable button is visualized. By contrast, the swipe gesture can be performed in any region on the touch-sensitive surface.

The user interface and the method make use of a metaphor that a user can use as a mental model for control. According to the metaphor, the selected virtual key has a coin on it that can be moved to adjacent virtual keys by the swipe gestures. Consequently, precisely one virtual key is selected at any time, said virtual key being able to be operated by a tap gesture in any region on the touch-sensitive surface, for example, as a result of which the applicable character is input.

The swipe gesture is performed over a short distance, for example. This distance may be at least 3 cm in one embodiment. It can be performed in a horizontal and vertical direction, but also in a diagonal direction. Diagonal swipe gestures allow particularly fast selection of the applicable virtual keys. Since it is also possible to perform multiple swipe gestures in succession, the selection of the virtual key can be modified as often as desired.

According to one embodiment, the selection of the virtual key is separated from the operation thereof by virtue of the operation of the selected virtual key requiring a separate touch input, in this case a tap gesture. This has the advantage that a user can first explore the user interface before performing an actual character input or function activation.

The method can be implemented on conventional, already existent hardware. The user interface is designed according to reliable and user-centered guidelines. It allows the virtual keys to be selected by simple swipe gestures.

BRIEF DESCRIPTION

Some of the embodiments will be described in detail, with reference to the following figures, wherein like designations denote like members, wherein:

FIG. 1 shows a user interface with a touchscreen 43 that comprises a touch-sensitive surface 44 that allows selection of virtual keys 21 of a virtual keypad 20, which is presented on the touchscreen 43, by means of horizontal and vertical swipe gestures;

FIG. 2 shows a virtual keypad 20 with virtual keys 21 that can be selected by means of horizontal, vertical and diagonal swipe gestures;

FIG. 3 shows a touch-sensitive surface 44 of a touchscreen on which a vertical swipe gesture 23 is performed;

FIG. 4 shows a touch-sensitive surface 44 of a touchscreen on which a vertical swipe gesture 23 is performed;

FIG. 6 shows a virtual keypad 20, the keys of which are arranged in the layout of a telephone keypad;

FIG. 7 shows a virtual keypad 20, the keys of which are arranged in the layout of a numerical keypad;

FIG. 8 shows a virtual keypad 20, the keys of which are arranged in the QWERTY layout;

Figure 11:
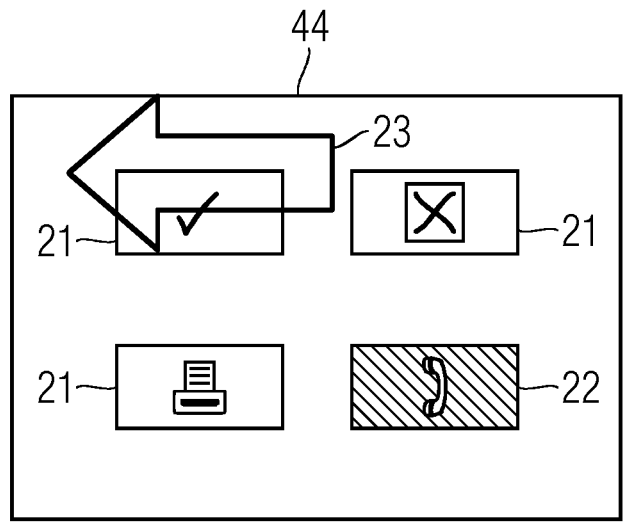
Figure 12:
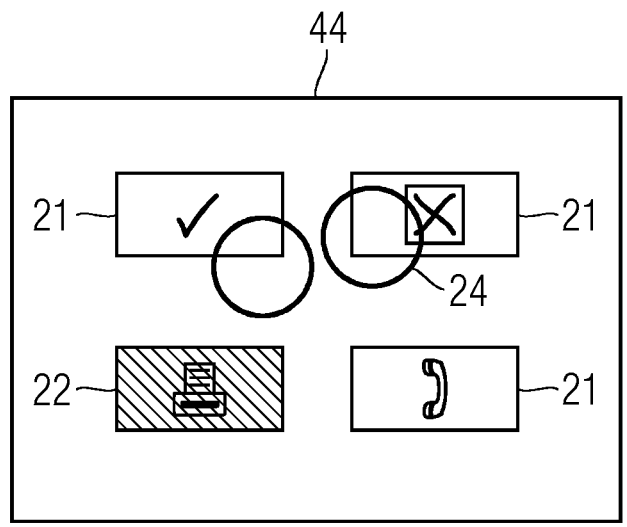
Figure 13:
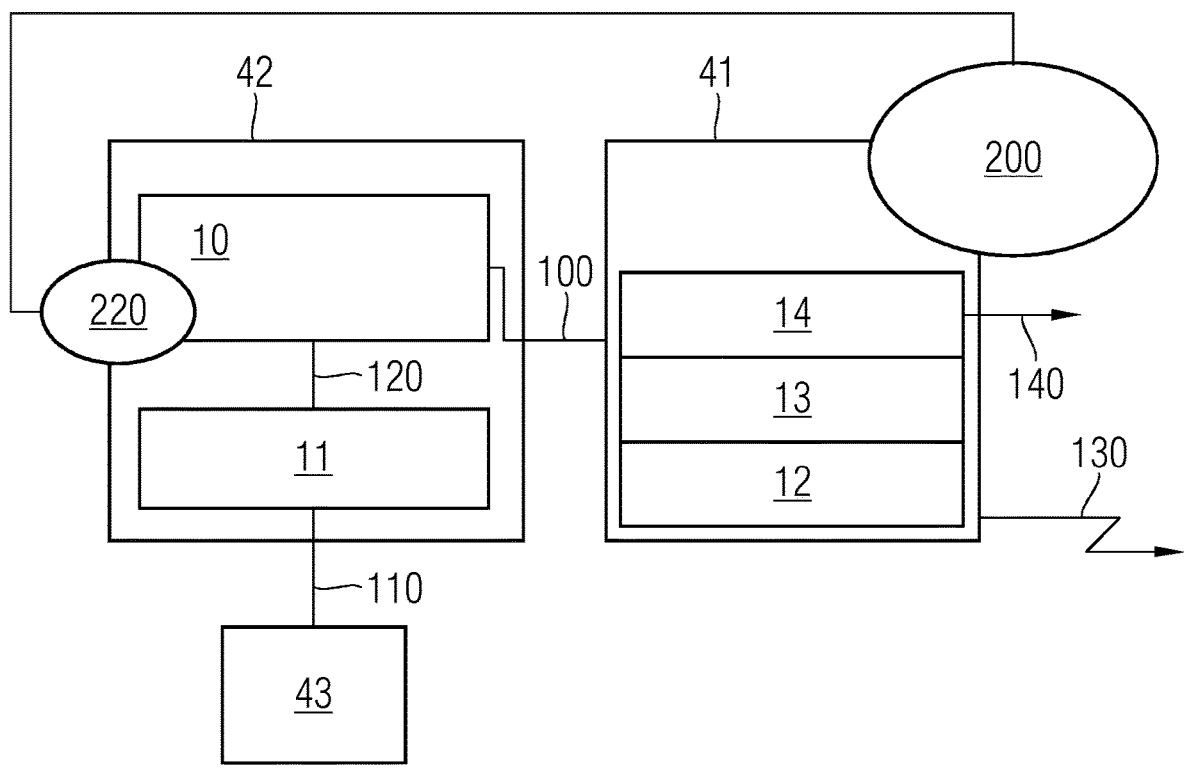

FIG. 9 shows virtual keys 21 that are displayed on a touchscreen on whose touch-sensitive surface 44 a horizontal swipe gesture 23 is performed;

FIG. 10 shows a touch-sensitive surface 44 of a touchscreen on which a vertical swipe gesture is performed;

FIG. 11 shows a touch-sensitive surface 44 of a touchscreen on which a horizontal swipe gesture 23 is performed;

FIG. 12 shows a touch-sensitive surface 44 of a touchscreen on which a tap gesture 24 is performed; and FIG. 13 shows a system architecture of a user interface.

DETAILED DESCRIPTION

FIG. 1 shows a user interface with a touchscreen 43 that comprises a touch-sensitive surface 44 that allows selection of virtual keys 21 of a virtual keypad 20, which is presented on the touchscreen 43, by means of horizontal and vertical swipe gestures. The virtual keys 21 are arranged in the layout of a telephone keypad. The virtual key in the center with the digit 5 is a previously selected virtual key 22 that is visually highlighted. Horizontal and vertical swipe gestures, which will be explained below, can be used to move the selection from the digit 5 to any of the other virtual keys 21 in line with the arrows shown in FIG. 1. After each swipe gesture, the label of the newly selected virtual key 22 is audibly output by voice synthesis and voice output. The virtual keypad 20 is displayed on the touchscreen 43, for example a multi-touch screen.

The touch inputs, including swipe gestures and tap gestures, are performed on a touch-sensitive surface 44 of the touchscreen 43. The touch-sensitive surface 44 is an active area on which touch inputs and gestures can be correctly evaluated. The touch-sensitive surface 44 may be smaller than a sensor area of the touch screen 43. A touch input outside the touch-sensitive surface 44 in the marginal region of the sensor area can lead to an audible or haptic error report. In the subsequent exemplary embodiments too, the touch-sensitive surface 44 denotes the active area on which touch inputs and gestures can be correctly evaluated, and which does not necessarily fill the entire sensor area and/or display area of the touchscreen 43.

FIG. 2 shows a virtual keypad 20 with virtual keys 21 in line with FIG. 1, in which the selection of the selected virtual key 22 can be moved not only by the horizontal and vertical swipe gestures but also by diagonal swipe gestures. Diagonal swipe gestures are also a possible variant in all of the other exemplary embodiments.

A metaphor used for operation is a coin that comes to rest on the virtual key with the digit 5 at the start of any digit input and that can be moved to the other virtual keys 21 by means of swipe gestures horizontally, vertically and diagonally. Theoretically, it will be possible to move the coin with any number of swipe gestures on the virtual keypad 20.

A simple swipe gesture to the right or left is used to push the coin from the digit 5 to the digit 6 or digit 4. Accordingly, a swipe gesture upward or downward from the digit 5 reaches the digit 2 or the digit 8. Corresponding diagonal swipe gestures reach the digits 1, 9, 3 and 7. Hence, all digits around the digit 5 are reached with a single swipe gesture. Selection of the digit 5 does not require a swipe gesture, on the other hand, since the coin is already there at the start and after any successful input. Only the digit 0 requires a downward swipe twice.

When the coin is on the desired digit, input of the digit is confirmed by a two-finger tap, i.e. by simply tapping with two fingertips. Thereafter, the coin is again on the digit 5 and the next digit can be selected and confirmed. Input is completed with a long two-finger tap.

A three-finger tap starts input from scratch, while a long three-finger tap aborts input. The swipe gestures and tap gestures can be effected at any points on the touch-sensitive surface 44 of the touchscreen 43. Audible or haptic signals confirm the success of the respective gesture or signal an unrecognized or erroneous gesture. Additionally, the respectively selected digit can be communicated to the user by voice output.

By way of example, an error is signaled when the coin is on the digit 6 and a swipe gesture to the right is used to attempt to push said coin beyond the edge of the virtual keypad 20. Thus, if the user performs a swipe gesture that cannot be processed, since there is no further virtual key available for selection on the virtual keypad in the direction of the swipe gesture, it is possible for a special audible or haptic signal to be output that indicates this to the user.

As a result, gesture-based input is provided for systems with a touchscreen, for example on automated teller machines, self-service terminals, checkout systems, payment terminals, parcel machines, credit transfer terminals or telephones. For feedback, it is also possible for vibrations to be generated in addition to tones and voice output. This method is particularly suitable for blind and visually impaired people. The system can provide a training mode for the user. In addition, voice synthesis allows advice and instructions to be output to the user.

Figure 5:
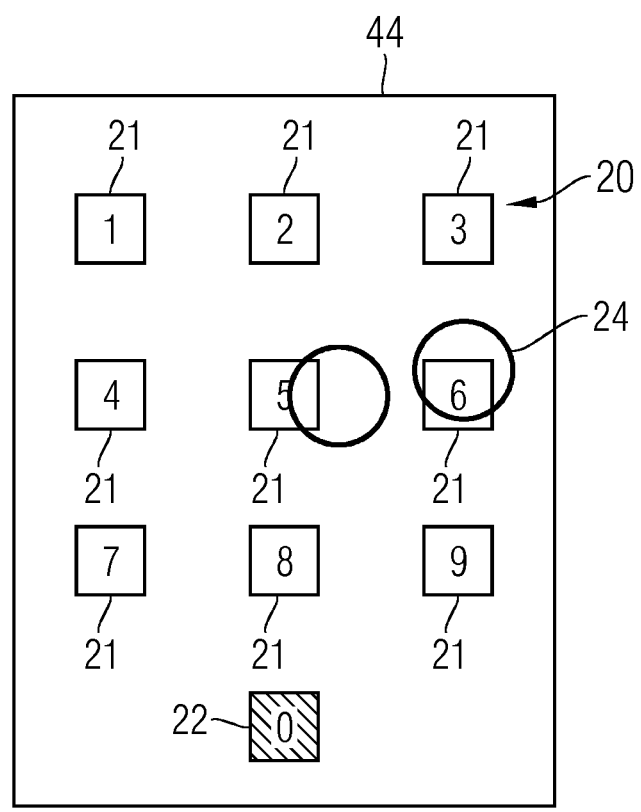
FIG. 5 shows a touch-sensitive surface 44 of a touchscreen on which a tap gesture 24 is performed.

The text below refers to a specific operator control sequence that is shown in FIGS. 3 to 5. As standard, at the start of any digit input, the selected virtual key 22 selected is the key with the digit 5 in the center. The selected digit 5 is announced by voice output. In the example shown in FIG. 3, the user wishes to select the virtual key 21 with the digit 0.

Independently of the presentation of the virtual keypad 20 on the touchscreen 43, the user can begin a swipe gesture 23 vertically from top to bottom at any point on the touch-sensitive surface 44, which by no means has to tally with the layout of the virtual keypad 20.

The swipe gesture 23 moves the selection to the virtual key 21 with the digit 8, which is shown as the selected virtual key 22 in FIG. 4 and is visually highlighted on the touchscreen. Additionally, the digit 8 is announced.

The user then performs a further vertical swipe gesture 23 from top to bottom on the touch-sensitive surface 44, as a result of which the digit 0 is selected as the selected virtual key 22, as shown in FIG. 5. Additionally, the digit 0 is announced. Since the user wishes to input the digit 0, he then performs a tap gesture 24—again at any location on the touch-sensitive surface 44—as a result of which the input of the digit 0 is confirmed.

Following confirmation of the input of the digit 0, the selection is returned to the virtual key 21 with the digit 5 again, which digit is announced to the user. Swipe gestures are therefore fundamentally not necessary for selecting the digit 5. Provided that this digit is intended to be input next, it suffices to perform a tap gesture in order to confirm selection of the virtual key 21 with the digit 5.

To select the virtual key 21 with the digit 3, the user can perform a swipe gesture to the right and a swipe gesture upward. Alternatively, the user can perform a swipe gesture diagonally upward to the right.

The user interface has an open functionality that allows a piece of screen reader software to audibly output the currently selected virtual key.

A further exemplary embodiment uses the arrangement of virtual keys 21 that is explained in the context of FIGS. 1 to 5 to input letters analogously to mobile phones that allow letter input using the numerical keys. For this purpose, the virtual keys 21 have the following associated letter sequences:
2: a, b, c
3: d, e, f
4: g, h, i
5: j, k, l
6: m, n, o
7: p, q, r, s
8: t, u, v
9: w, x, y, z In a text input mode, the virtual keys 21 each have the first letter from the letter sequence associated with them as standard. To input this first letter, the desired virtual key 22 is selected by swipe gestures as explained in the context of FIGS. 1 to 5. The input of the first letter is then confirmed by a two-finger tap.

To select a subsequent letter from the letter sequence, the respective virtual key 22 is selected by swipe gestures as explained in the context of FIGS. 1 to 5. The user then changes the assignment of the selected virtual key 22 by means of a single-finger tap, with the letter that is currently assigned to the selected virtual key 22 being replaced by the letter that succeeds it in the letter sequence. This can be repeated as often as desired, the first letter in the letter sequence being assigned to the selected virtual key 22 again following the last letter in the letter sequence. The respectively assigned letter is communicated to the user by voice output, so that said user is provided with acoustic feedback with the current letter each time he scrolls through the key assignment. Subsequently, input of the letter selected from the letter sequence is confirmed by a two-finger tap.

Following input of each letter, the selection returns to the virtual key 21 that would input the digit 5 in the digit input mode, as explained in the context of FIGS. 1 to 5.

In the present exemplary embodiment, it is possible for the word "hello" to be input by means of the following touch inputs:
h: to the left, single-finger tap, two-finger tap
e: upward, two-finger tap
l: single-finger tap, single-finger tap, two-finger tap
l: single-finger tap, single-finger tap, two-finger tap
o: to the right, single-finger tap, single-finger tap, two-finger tap FIG. 6 shows a virtual keypad 20 that is additionally extended by the two special characters from a telephone keypad. A virtual keypad 20 of this kind is suitable for inputting telephone numbers, for example. Starting from the virtual key with the digit 5 that is selected as standard, it is possible to select the virtual keys with the special characters * and # by means of two vertical and one horizontal swipe gesture (downward, downward, to the left; downward, downward, to the right) or by means of a vertical and a diagonal swipe gesture, for example.

FIG. 7 shows a virtual keypad 20 whose keys are arranged in accordance with the layout of a numerical keypad. Starting from the virtual key 22 with the digit 5 that is selected as standard, it is possible to select the virtual key with the digit 0 by means of two vertical and one horizontal swipe gesture (downward, to the left, downward) or by means of a vertical and a diagonal swipe gesture, for example.

FIG. 8 shows a virtual keypad 20 whose keys are arranged in the QWERTY layout. According to this exemplary embodiment, it is possible for letters to be selected and input. Starting from the virtual key 22 with the letter D that is selected as standard, it is possible to select the virtual keys with the assignment Q, A, Z, T, G and B by swipe gestures as follows, for example:
Q: to the left, to the left, upward
A: to the left, to the left
Z: to the left, to the left, downward
T: to the right, to the right, upward
G: to the right, to the right
B: to the right, to the right, downward.

FIG. 9 shows virtual keys 21 and a selected virtual key 22 that are visually output on a multi-touch screen as touchscreen 43. Visual output of buttons of this kind can be practiced in alternation with digit input as described in the context of FIGS. 1 to 5. By way of example, a user can first of all input a telephone number before arriving by means of a suitable tap gesture at the screen view shown in FIG. 9.

The selected virtual key 22 with a confirm functionality is selected first and is read aloud to the user by a screen reader function. By means of a tap gesture, the user could confirm this selection, as a result of which the input telephone number is dialed, for example.

The arrangement of the virtual keys 21 in FIG. 9 cannot be referred to as a virtual keypad, since only single buttons are involved. Nevertheless, the same mechanism applies for this exemplary embodiment as described previously, since in this case too there are clear neighborhood relationships between the virtual keys 21.

By means of a swipe gesture 23 to the right, the user in the example shown moves the selection to the virtual key with the abort symbol, as shown in FIG. 10. The now selected abort function is read aloud to the user by a screen reader function. The user then performs a swipe gesture 23 downward, as a result of which the selection is moved to the key with the telephone symbol. In line with FIG. 11, the user subsequently performs a swipe gesture 23 to the left, as a result of which the selection comes to rest on the key with the printer symbol. In this way, it is possible for the user to use simple swipe gestures 23 to explore the content of the screen, the assignments or functions of the keys or buttons being read aloud to him by means of voice synthesis each time.

Since the user in the example shown wishes to produce a printout, in FIG. 12 he performs a tap gesture 24 with two fingertips on the touchscreen 43, as a result of which selection of the selected virtual key 22 with the printer symbol is confirmed.

FIG. 13 shows a schematic depiction of an exemplary embodiment of the user interface. The design substantially consists of three elements. A data processing unit 41 has a microprocessor, a memory and an operating program 200. Furthermore, it has an audio unit 14 with an amplifier and a loudspeaker, a vibration generator 13 for producing haptic signals and a display 12 or a graphics card for actuating the latter. The audio unit 14 preferably has a headphone port 140. Preferably, the user interface provides an adjustment option for the volume at the headphone port 140. The operating program 200 is executed by the data processing unit 41. The data processing unit 41 has a communication interface 130 to further systems.

A further element of the user interface is a security module 42 that comprises a second microcontroller 10 having a memory and a processor, on the one hand, and a first microcontroller 11 for evaluating inputs that a touchscreen 43 having a touch-sensitive surface reports to the first microcontroller 11 via a first communication interface. The security module 42 contains a control program 220 that is stored on a piece of firmware. The first microcontroller 11 is connected to the second microcontroller 10 via a second communication interface 120.

The communication interfaces 100, 110 and 120 may be in the form of a serial interface.

The second microcontroller 10 is connected to the data processing unit 41 via an external communication interface 100, so that the operating program 200 on the data processing unit 41 can communicate with the control program 220 on the security module 42. The touchscreen 43 forwards touch inputs such as tap gestures or swipe gestures to the first microcontroller 11, for example as (a multiplicity of) coordinates or vectors in a coordinate system. The touchscreen 43 may also be coincident with the display 12 and be in the form of a multi-touch screen.

The operating program 200 prompts screen outputs on the display 12 or the touchscreen 43, audible signals that are output by the audio unit 14 and haptic signals that are produced by the vibration generator 13. Essentially, the operating program 200 controls the user interface for sighted, visually impaired and blind people who wish to use the respective system. In one possible application, a blind user inputs an account number in order to perform a financial transaction.

The control program 220 on the firmware of the security module 42 provides the accordingly required functions of the security module 42 for the data processing unit 41 via the external communication interface 100. In the context of this exemplary embodiment, these include the evaluation of touch inputs that the user performs on the touch-sensitive surface of the touchscreen 43, the interpretation of these touch inputs as swipe gestures or tap gestures, the processing of the touch inputs for the selection of digits on the virtual keypad, and the sending of notifications via the external communication interface 100 after every detected touch input.

Provided that the touchscreen 43 is in the form of a multi-touch screen, it should be able to process at least two-finger gestures. Preferably, the data processing unit 41 has a voice synthesis module that can guide and assist the user. The individual touch inputs can be acknowledged by audible or haptic signals. Possible touch inputs are, by way of example, tap gestures, double tap gestures, longer tapping and touching, scrolling, swipe gestures, etc.

The special assistance for users can be activated automatically as soon as headphones are plugged into the headphone port 140. Alternatively, the user interface can be configured such that touching and holding with a finger for three seconds in the top right-hand corner of the screen activates the assistance mode for blind or visually impaired users, for example. In this case, the standard mode of the user interface for processing touch inputs and gestures is changed over to an input mode with special assistance for blind and visually impaired people that supports specific gestures and acknowledges them with audible signals, so that blind users can operate the user interface conveniently and intuitively. To leave the special mode for assisting blind users, it is possible for the headphones to be unplugged from the headphone port 140, for example.

After the desired virtual key has been selected, the touch-sensitive surface of the touchscreen 43 can be double tapped with a finger, for example. This tap gesture activates the selected virtual key, as a result of which the associated digit is input. Another suitable tap gesture is a single tap with two fingertips in order to operate the selected virtual key.

A further gesture can be reserved for changing to and fro between digit input and buttons as in FIGS. 9 to 12. In this regard, the gesture defined is a double tap with two fingertips, for example. This pauses or terminates digit input and places the focus on buttons, as are shown in FIGS. 9 to 12, for example. Such buttons have the assigned functions "Clear all digits", "Clear last digit", "Confirm input" and "Back", for example.

On a credit transfer terminal, the screen content presented by the touchscreen 43 is split into different regions, for example: a field containing the sum to be paid, a field for the account number of the recipient and a region with the aforementioned four buttons for confirming or clearing the input digits.

Suitable audible voice synthesis outputs can guide a blind user in conjunction with a screen reader functionality. By way of example, the following voice synthesis outputs can assist the user in a whole sequence:
1. Please insert your card
2. Your card could not be detected, please try again
3. Your card has been detected, please double tap the screen to continue
4. The sum to be paid is $450.00, please double tap with one finger to continue
5. Please enter the account number of the recipient
6. Please swipe left, right, up or down to select the next virtual key
7. Five-Four-Seven
8. Please double tap to confirm the number seven As soon as the user changes to the screen view shown in FIG. 12, the assignment or function of the selected virtual key 22 is read aloud to him, for example "Please confirm the transaction". This means that the key "Confirm transaction" selected as standard is read aloud to the user again after every change to these control keys. Examples of suitable voice outputs following successive selection of different buttons analogously to FIGS. 9 to 12 are:
1. Please double tap to continue
2. Please double tap to abort
3. Please double tap to clear the last digit
4. Please double tap to clear all digits
5. Please double tap to return to the main menu
6. Please double tap to print a statement According to one exemplary embodiment, a user activates the assistance mode by plugging headphones into the headphone port 140. He is then provided with detailed information about the supported gestures. Optionally, a demonstration and practice mode is provided that allows the user to familiarize himself with the user interface.

After the user has correctly inserted his card and input the sum to be transferred, said sum is read aloud and completed with a voice output "Please enter the account number of the recipient". This voice output is repeated until the user has confirmed with a double tap that he wishes to continue with the transaction. The virtual keypad 20 from FIG. 1 to FIG. 5 is then activated, which allows the user to input the account number. An audible voice request asks the user to input the first digit.

Although the invention has been illustrated and described in detail by the exemplary embodiments, it is not limited by the disclosed examples. Other variations can be derived therefrom by a person skilled in the art without departing from the scope of protection of the invention. The exemplary embodiments, variants, embodiments and developments described can also be combined with one another without restriction.

The invention claimed is:

1. A user interface, comprising:
a touchscreen for visual output and for capturing touch inputs,
an audio unit, and
a processor or multiple processors that are programmed to present an arrangement of virtual keys on the touchscreen, one of which is selected at any time, and to actuate the audio unit to audibly output a label or function of each of the virtual keys as soon as said virtual key is selected,
wherein the processor or the processors are programmed:
to process a touch input of a finger on the touchscreen that can be performed as a swipe gesture in any region on a touch-sensitive surface of the touchscreen,
to select a virtual key that is arranged next to the previously selected virtual key in the direction of the swipe gesture,
to detect a first two-finger tap gesture, wherein the first two-finger tap gesture comprises a single two-finger tap that can be performed in any region on the touch-sensitive surface of the touchscreen, wherein the selection of the virtual key is confirmed by the single two-finger tap gesture, and
to detect a second two-finger tap gesture, wherein the second two-finger tap gesture comprises an extended two-finger tap in any region on the touch-sensitive surface of the touchscreen, wherein the second two-finger tap gesture completes an input, the input comprising one or more confirmed virtual keys, and
wherein the swipe gesture is at least one of horizontal and vertical swipe gestures, or horizontal, vertical and diagonal swipe gestures,
wherein the virtual keys are arranged in a rectangular grid, so that horizontal, vertical or diagonal neighbors of the selected virtual key are explicitly determined.

2. The user interface as claimed in claim 1, in which the processor or the processors are programmed to detect a touch input that can be performed as a tap gesture in any region on the touch-sensitive surface of the touchscreen, and to capture a character that is assigned to the virtual key selected at the time of the tap gesture, or to perform a function that is assigned to the virtual key at the time of the tap gesture.

3. The user interface as claimed in claim 2, having a vibration generator and a data processing unit, which is programmed to output a first audible and/or haptic signal during or after the swipe gesture, to output a second audible and/or haptic signal during or after the tap gesture, and to output a third audible and/or haptic signal after a touch input that has not been detected.

4. The user interface as claimed in claim 3, in which the processor or one of the processors is programmed to follow detection of a swipe gesture by retaining the previously selected virtual key, provided that there is no virtual key arranged next to the previously selected virtual key in the direction of the swipe gesture, and—in which the data processing unit is programmed to acknowledge this swipe gesture by outputting the third audible and/or haptic signal or a fourth audible and/or haptic signal.

5. The user interface as claimed in claim 2, in which the processor or one of the processors is programmed to follow any capture of a character by selecting a firmly prescribed key among the virtual keys as the selected virtual key, and to detect a three-finger tap gesture that can be performed in any region on the touch-sensitive surface of the touchscreen, wherein the three-finger tap gesture starts a new input.

6. The user interface as claimed in claim 5, in which the virtual keys are arranged in four rows, wherein the digits 1, 2, 3 are assigned to three virtual keys from left to right in the topmost row, the digits 4, 5, 6 are assigned to three virtual keys from left to right in the second row, the digits 7, 8, 9 are assigned to three virtual keys from left to right in the third row, and—the digit 0 is assigned to a virtual key that is in the bottommost row in a central position, and in which the processor or one of the processors is programmed to follow any capture of a character by selecting the virtual key to which the digit 5 is assigned as the selected virtual key.

7. The user interface as claimed in claim 6, in which the virtual key to which the digit 0 is assigned is selectable by two successive swipe gestures downward, provided that the virtual key to which the digit 5 is assigned was previously selected.

8. The user interface as claimed in claim 1, in which the touchscreen processes touches with one or more fingertips as touch inputs and transmits them to a first processor as coordinates or vectors in a coordinate system, in which the first processor is programmed to detect the touch inputs, and in which a second processor is programmed to select the virtual key.

9. The user interface as claimed in claim 1, in which the processor or the processors are programmed to detect a first touch input that can be performed as a first tap gesture in any region on the touch sensitive surface of the touchscreen, to replace a character that is assigned to the virtual key selected at the time of the first tap gesture with a character that succeeds the character in a sequence of characters, particularly to prompt voice output of the succeeding character, particularly to repeat these three steps, to detect a second touch input that can be performed as a second tap gesture in any region on the touch-sensitive surface of the touchscreen, and to capture the character that is assigned to the selected virtual key at the time of the second tap gesture.

10. An access system, self-service terminal, checkout system, payment terminal, automated teller machine, credit transfer terminal, parcel machine, smartphone, tablet, laptop or personal computer that has the user interface as claimed in claim 1.

11. A method for operating a system, in which a processor or multiple processors present an arrangement of virtual keys, precisely one of which is selected at any time, on a touchscreen, and
  actuate an audio unit to audibly output a label or function of each of the virtual keys as soon as said virtual key is selected, wherein the processor or the processors process a touch input of a finger on the touchscreen that is performed as a swipe gesture in any region on a touch-sensitive surface of the touchscreen, and
  select a virtual key that is arranged next to the previously selected virtual key in the direction of the swipe gesture,
  detecting a first two-finger tap gesture, the first two-finger tap gesture comprising a single two-finger tap gesture, the first two-finger tap gesture confirming a virtual key which is selected at the time of the first two-finger tap gesture,
  detecting a second two-finger tap gesture, the second two-finger tap gesture comprising an extended two-finger tap gesture in any region on the touch-sensitive surface of the touchscreen, and completing an input after the extended two-finger tap gesture is detected, wherein the input comprises at least one confirmed virtual key, wherein the swipe gesture is at least one of horizontal and vertical swipe gestures, or horizontal, vertical and diagonal swipe gestures, and wherein the virtual keys are arranged in a rectangular grid, so that horizontal, vertical or diagonal neighbors of the selected virtual key are explicitly determined.

12. The method as claimed in claim 11, in which the processor or the processors detect a touch input that is performed as a tap gesture in any region on the touch-sensitive surface of the touchscreen, and capture a character that is assigned to the virtual key selected at the time of the tap gesture, or perform a function that is assigned to the virtual key selected at the time of the tap gesture.

13. The method as claimed in claim 12, in which a data processing unit uses the audio unit and/or a vibration generator to output a first audible and/or haptic signal during or after the swipe gesture, to output a second audible and/or haptic signal during or after the tap gesture, and—to output a third audible and/or haptic signal after a touch input that has not been detected.

14. The method as claimed in claim 13, in which the processor or one of the processors follows detection of a swipe gesture by retaining the previously selected virtual key, provided that there is no virtual key arranged next to the previously selected virtual key in the direction of the swipe gesture, and—in which the data processing unit acknowledges this swipe gesture by outputting the third audible and/or haptic signal or a fourth audible and/or haptic signal.

15. The method as claimed in claim 12 in which the processor or one of the processors follows any capture of a character by selecting a firmly prescribed key among the virtual keys as the selected virtual key.

16. The method as claimed in claim 15, in which the virtual keys are arranged in four rows, wherein the digits 1, 2, 3 are assigned to three virtual keys from left to right in the topmost row, the digits 4, 5, 6 are assigned to three virtual keys from left to right in the second row, the digits 7, 8, 9 are assigned to three virtual keys from left to right in the third row, and the digit 0 is assigned to a virtual key that is in the bottommost row in a central position, and in which the processor or one of the processors follows any capture of a character by selecting the virtual key to which the digit 5 is assigned as the selected virtual key.

17. The method as claimed in claim 16, in which the virtual key to which the digit 0 is assigned is selected by two successive swipe gestures downward, provided that the virtual key to which the digit 5 is assigned was previously selected.

18. The method as claimed in claim 11, in which the touchscreen processes touches with one or more fingertips as touch inputs and transmits them to a first processor as coordinates or vectors in a coordinate system, in which the first processor detects the touch input, and in which a second processor selects the virtual key.

19. The method as claimed in claim 11, in which the processor or the processors detect a first touch input that is performed as a first tap gesture in any region on the touch-sensitive surface of the touchscreen, replace a character that is assigned to the virtual key selected at the time of the first tap gesture with a character that succeeds the character in a sequence of characters, particularly prompt voice output of the succeeding character, particularly repeat these three steps, detect a second touch input that is performed as a second tap gesture in any region on the touch-sensitive surface of the touchscreen, and capture the character that is assigned to the selected virtual key at the time of the second tap gesture.

20. A non-transitory computer-readable data storage medium that stores a computer program that performs the method as claimed in claim 11 when it is executed in a processor or multiple processors.

* * * * *